US012692906B2

(12) United States Patent
Kubo et al.

(10) Patent No.: US 12,692,906 B2
(45) Date of Patent: Jul. 28, 2026

(54) PROPELLER SHAFT YOKE AND PROPELLER SHAFT

(71) Applicant: HITACHI ASTEMO, LTD., Hitachinaka (JP)

(72) Inventors: Masashi Kubo, Hitachinaka (JP); Kenichiro Ishikura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 327 days.

(21) Appl. No.: 18/549,449

(22) PCT Filed: Jan. 14, 2022

(86) PCT No.: PCT/JP2022/001043
§ 371 (c)(1),
(2) Date: Sep. 7, 2023

(87) PCT Pub. No.: WO2022/190619
PCT Pub. Date: Sep. 15, 2022

(65) Prior Publication Data
US 2024/0301920 A1 Sep. 12, 2024

(30) Foreign Application Priority Data
Mar. 12, 2021 (JP) ................................. 2021-040280

(51) Int. Cl.
*F16D 3/40* (2006.01)
*F16D 3/41* (2006.01)

(52) U.S. Cl.
CPC . *F16D 3/40* (2013.01); *F16D 3/41* (2013.01)

(58) Field of Classification Search
CPC ...................................... F16D 3/40; F16D 3/41

USPC .................................................. 464/134–135
See application file for complete search history.

(56) References Cited

U.S. PATENT DOCUMENTS

| | | | | |
|---|---|---|---|---|
| 9,714,682 B2 * | 7/2017 | Erlmann | ................... | F16D 3/41 |
| 2017/0199452 A1 | 7/2017 | Hamada | | |

FOREIGN PATENT DOCUMENTS

| | | |
|---|---|---|
| DE | 10 2006 039 535 A1 | 3/2008 |
| JP | H05-118343 A | 5/1993 |
| JP | 2005-163179 A | 6/2005 |
| JP | 2006-193375 A | 7/2006 |
| JP | 2015-117741 A | 6/2015 |
| JP | 2017-122830 A | 7/2017 |

(Continued)

OTHER PUBLICATIONS

International Search Report dated Mar. 15, 2022 issued in International Application No. PCT/JP2022/001043, with English translation, 7 pages.

(Continued)

*Primary Examiner* — Greg Binda
(74) *Attorney, Agent, or Firm* — FOLEY & LARDNER LLP

(57) ABSTRACT

A first arm outer edge chamfered portion and a second arm outer edge chamfered portion are formed along both side edges on an outer side of each of a first arm base portion and a second arm base portion. With this structure, it is possible to reduce a radius (radii) of rotation of a first arm portion and a second arm portion of a first yoke. The reduced radius (radii) can thereby increase a layout property of the first yoke and a propeller shaft using this first yoke.

6 Claims, 10 Drawing Sheets

(56)         References Cited

FOREIGN PATENT DOCUMENTS

JP        2018-128139  A        8/2018
JP        2018-144817  A        9/2018

OTHER PUBLICATIONS

Decision of Refusal dated Jul. 9, 2024 issued in JP Application No. 2023-505153, with English translation, 6 pages.
Notice of Reasons for Refusal dated Feb. 27, 2024 issued in JP Application No. 2023-505153, with English translation, 9 pages.

* cited by examiner

PROPELLER SHAFT YOKE AND PROPELLER SHAFT

TECHNICAL FIELD

The present invention relates to a yoke of a propeller shaft and the propeller shaft.

BACKGROUND ART

As an example of a yoke of a conventional propeller shaft, for instance, a yoke disclosed in the following Patent Document 1 is known.

This propeller shaft is connected to a rotation shaft of a vehicle-mounted transmission and a rotation shaft of a vehicle-mounted differential gear via respective universal joints structured as cardan joints.

The universal joint is structured so that a first yoke and a second yoke, which are a pair of yokes each having a bifurcated shape so as to face each other across a rotation axis of the propeller shaft, are coupled together through a cruciform shaft.

CITATION LIST

Patent Document

Patent Document 1: Japanese Unexamined Patent Application Publication No. 2018-144817

SUMMARY OF THE INVENTION

Technical Problem

In a case of the yoke (the first and second yokes) used for the conventional universal joint, however, circumferential direction both side edge portions, at a radial direction outer side, of each arm portion of the yoke are each formed by a corner portion (or an angle portion). That is, a radial direction outer surface of the arm portion and circumferential direction both side surfaces connecting this radial direction outer surface and a radial direction inner surface are connected at a substantially right angle. Because of this, a radius of rotation of the arm portion becomes large, and consequently, there is a risk that the arm portion will interfere with other vehicle-mounted components.

Here, as a means of reducing the radius of rotation of the arm portion, it is conceivable that a distance between the arm portions of each of the first yoke and the second yoke, i.e. a distance between one arm outer surface and the other arm outer surface of each of the first yoke and the second yoke, could be shortened. However, in order to reduce a size of the yoke in this manner, a die for forging the yoke must be newly designed, and this makes it difficult to contribute to reduction in a manufacturing cost of the yoke and the propeller shaft.

The present invention was made in view of the above technical problem of the yoke of the conventional propeller shaft. An object of the present invention is therefore to provide the yoke of the propeller shaft and the propeller shaft which are capable of reducing the radius (radii) of rotation of a first arm portion and a second arm portion without shortening the distance between the outer surfaces of the first arm portion and the second arm portion.

Solution to Problem

As one aspect of the present invention, a yoke has a first arm outer edge chamfered portion provided at both side edges, in a circumferential direction of a rotation axis of a propeller shaft, on an outer side, in a radial direction, of a first arm base portion so as to extend along the both side edges of the first arm base portion and recessed from the outer side of the first arm base portion toward the rotation axis, and a second arm outer edge chamfered portion provided at both side edges, in the circumferential direction of the rotation axis, on an outer side, in the radial direction, of a second arm base portion so as to extend along the both side edges of the second arm base portion and recessed from the outer side of the second arm base portion toward the rotation axis.

Effects of Invention

According to the present invention, it is possible to reduce the radius (radii) of rotation of the first arm portion and the second arm portion without shortening the distance between the outer surfaces of the first arm portion and the second arm portion.

EMBODIMENTS FOR CARRYING OUT THE INVENTION

Figure 1:
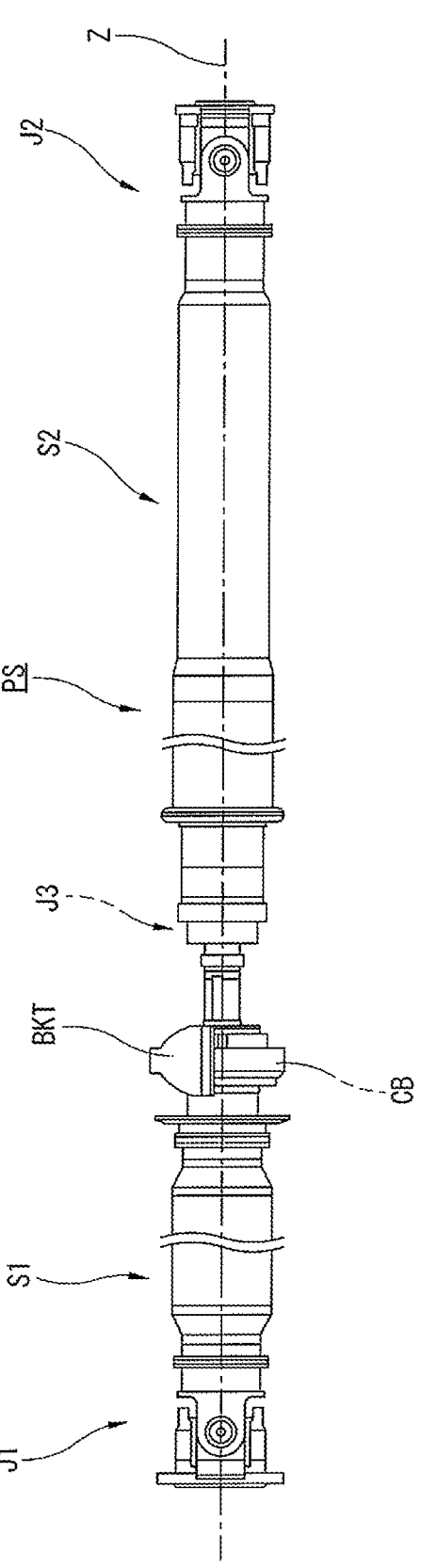
FIG. 1 is a side view of a propeller shaft according to the present invention.

Embodiments of a yoke of a propeller shaft and the propeller shaft according to the present invention will be described below with reference to the drawings. In the following description, for the sake of convenience, a left side in FIG. 1 is referred to as a "front", and a right side is referred to as a "rear". Further, a direction along a rotation axis Z in each drawing is referred to as an "axial direction", a direction orthogonal to the rotation axis Z is referred to as a "radial direction", and a direction of rotation about the rotation axis Z is referred to as a "circumferential direction".
(Configuration of Propeller Shaft)

FIG. 1 is a side view of a propeller shaft PS according to the present invention, illustrating outward appearances of the propeller shaft PS.

As shown in FIG. 1, the propeller shaft PS is disposed between a first rotation shaft (not shown) that is a rotation shaft located at a front side of a vehicle and a second rotation shaft (not shown) that is a rotation shaft located at a rear side of the vehicle along a longitudinal direction of the vehicle. For instance, in a vehicle with an FR (front engine and rear drive) drive system, the first rotation shaft corresponds to an output shaft of a change gear (transmission) which is arranged at the front side of the vehicle and to which a rotation force is transmitted from a drive source such as an engine and a motor. The second rotation shaft corresponds to an input shaft of a differential gear (differential) which is arranged at the rear side of the vehicle and which transmits the rotation force to rear wheels of the vehicle.

That is, the propeller shaft PS according to the present embodiment has a two-piece structure in which a shaft portion is divided into two of a front part and a rear part, and a first shaft member S1 connected to the first rotation shaft and a second shaft member S2 connected to the second rotation shaft are connected so as to be able to integrally rotate about the rotation axis Z via a third universal joint J3 that is a well-known constant velocity joint. The propeller shaft PS is rotatably supported by a center bearing CB disposed close to the third universal joint J3 and suspended on a vehicle body (not shown) through a well-known bracket BKT.

A front end portion of the propeller shaft PS is connected to the first rotation shaft (not shown) via a first universal joint J1 structured as a cardan joint. Likewise, a rear end portion of the propeller shaft PS is connected to the second rotation shaft (not shown) via a second universal joint J2 structured as the cardan joint.

(Configuration of Universal Joint)

Figure 2:
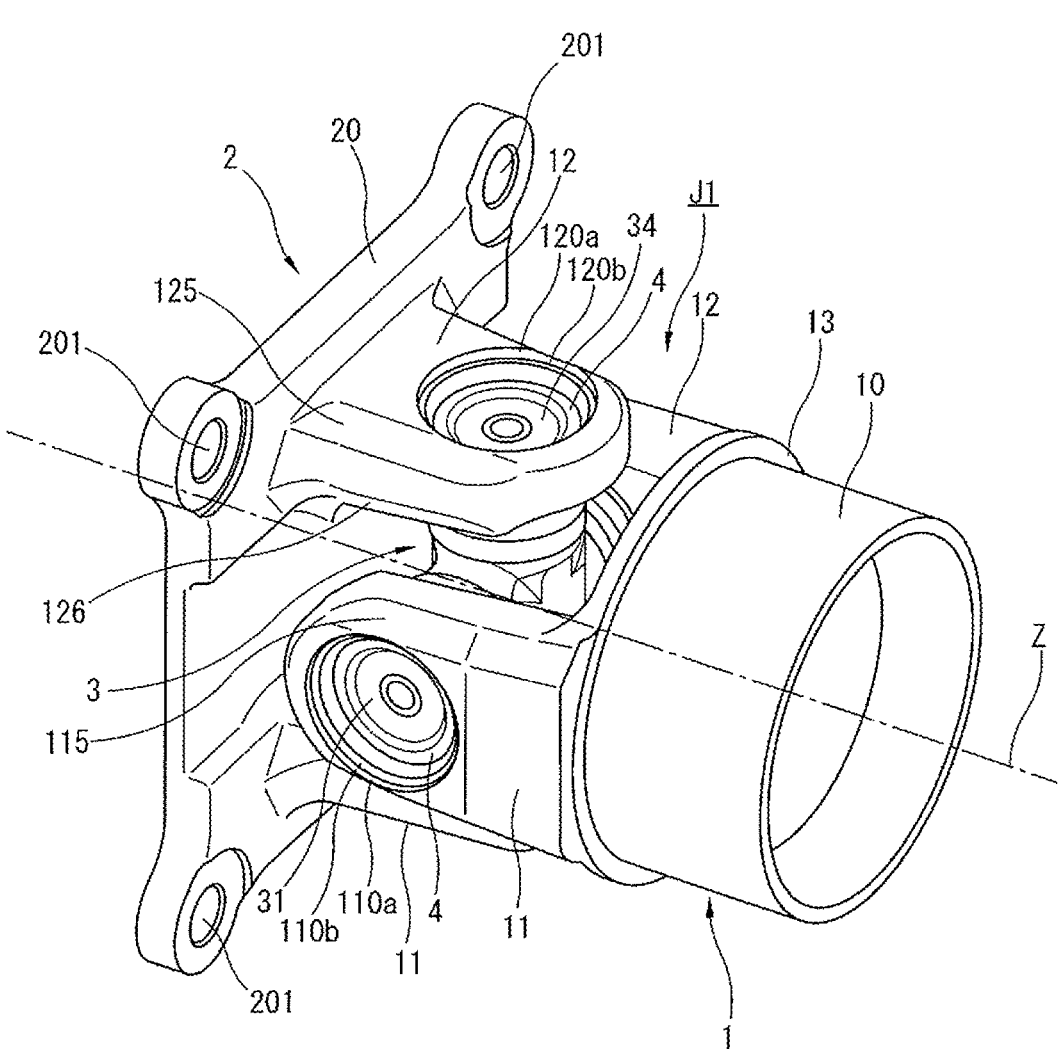
FIG. 2 is a perspective view of a first universal joint shown in FIG. 1, viewed from a shaft portion side.
Figure 3:
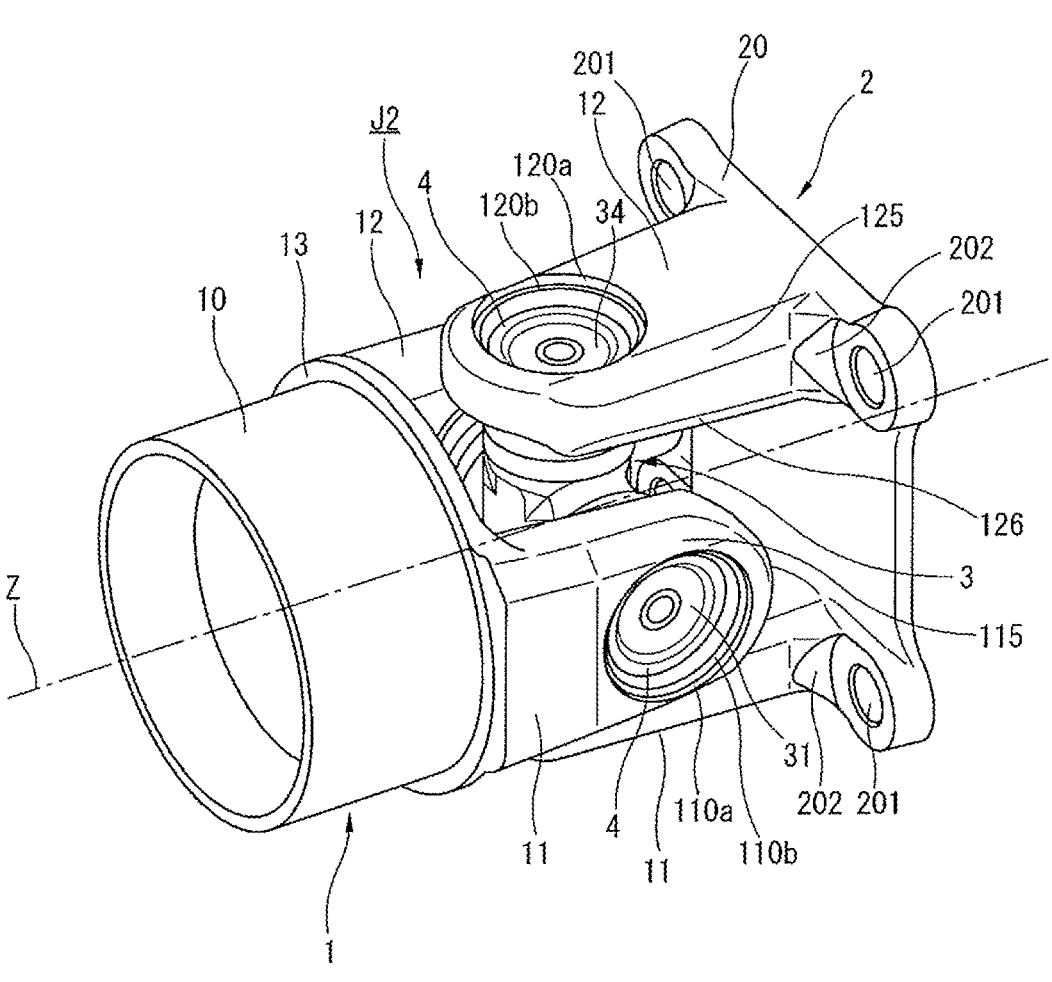
FIG. 3 is a perspective view of a second universal joint shown in FIG. 1, viewed from a shaft portion side.

FIG. 2 is a perspective view of the first universal joint J1, viewed from a shaft portion side. FIG. 3 is a perspective view of the second universal joint J2, viewed from a shaft portion side. Here, since the first universal joint J1 and the second universal joint J2 have substantially the same structure, in the present embodiment, for the sake of convenience, only the second universal joint J2 will be described in detail. Structure or configuration of the first universal joint J1 which is the same as that of the second universal joint J2 is denoted by the same reference sign as that of the second universal joint J2 in FIG. 2, and its detailed description is omitted.

As illustrated in FIG. 2, the first universal joint J1 has a pair of yokes formed by a first yoke 1 connected to the first shaft member S1 (see FIG. 1) of the propeller shaft PS and a second yoke 2 connected to the first rotation shaft and a cruciform shaft (spider) 3 interposed between the pair of yokes (the first and second yokes 1 and 2) and connecting both these yokes 1 and 2 so as to be able to relatively rotate.

As illustrated in FIG. 3, the second universal joint J2 has a pair of yokes formed by a first yoke 1 connected to the second shaft member S2 (see FIG. 1) of the propeller shaft PS and a second yoke 2 connected to the second rotation shaft and a cruciform shaft (spider) 3 interposed between the pair of yokes (the first and second yokes 1 and 2) and connecting both these yokes 1 and 2 so as to be able to relatively rotate.

The first yoke 1 has a tubular base portion 10 as a fixing portion fixed to the second shaft member S2 (see FIG. 1) of the propeller shaft PS by, for instance, friction welding and a pair of first and second arm portions 11 and 12 extending parallel from a surface, facing the second yoke 2, of the tubular base portion 10 toward the second yoke 2 side along the rotation axis Z of the propeller shaft PS. The tubular base portion 10 and the first and second arm portions 11 and 12 are formed integrally with each other by, for instance, casting.

The first and second arm portions 11 and 12 are provided so as to be symmetric with respect to a line of the rotation axis Z. First and second arm penetration holes 110 and 120, which face each other across the rotation axis Z, are formed at respective top end sides of the first and second arm portions 11 and 12 so as to penetrate the respective top end sides of the first and second arm portions 11 and 12 along the radial direction (a direction of a radial direction line Y). Cylindrical needle bearings 4 are inserted between the first and second arm penetration holes 110 and 120 and both shaft portions 31 and 33 (see FIG. 7) of the cruciform shaft 3 respectively, and by these needle bearings 4, the both shaft portions 31 and 33 (see FIG. 7) of the cruciform shaft 3 are rotatably supported. The needle bearings 4 are fixed to the first and second arm penetration holes 110 and 120 so as not to come off by caulking stepped portions 110b and 120b of first and second countersunk (or counterbore) portions 110a and 120a whose diameters widen in a stepped manner at outer end portions of the respective first and second arm penetration holes 110 and 120. Here, for the sake of convenience, FIG. 3 illustrates a state before caulking the stepped portions 110b and 120b of the countersunk portions 110a and 120a.

The second yoke 2 has a flange portion 20 formed into a substantially plate shape and a pair of arm portions of a first arm portion 11 and a second arm portion 12 extending parallel from a surface, facing the first yoke 1, of the flange portion 20 toward the first yoke 1 side along the rotation axis Z of the propeller shaft PS. The flange portion 20 and the first and second arm portions 11 and 12 are formed integrally with each other by, for instance, casting.

The flange portion 20 has a substantially rectangular plate shape, and bolt penetration holes 201 are formed at four corners. The flange portion 20 is connected to the second rotation shaft with bolts (not shown) that penetrate the respective bolt penetration holes 201. It is noted that as a plane shape of the flange portion 20, in addition to the rectangular shape exemplified in the present embodiment, the shape of the flange portion 20 can be freely changed according to a connection shape of the second rotation shaft which is a mating side, such as a circular shape and an irregular shape. This also applies to the second yoke 2 of the first universal joint J1.

The pair of first and second arm portions 11 and 12 of the second yoke 2 functions in pairs with the pair of first and second arm portions 11 and 12 of the first yoke 1 described above, and the first and second arm portions 11 and 12 of the second yoke 2 basically have the same structure or configuration as that of the first and second arm portions 11 and 12 of the first yoke 1. Therefore, structure or configuration of the first and second arm portions 11 and 12 of the second yoke 2 which is the same as that of the first and second arm portions 11 and 12 of the first yoke 1 is denoted by the same reference sign as that of the first and second arm portions 11 and 12 of the first yoke 1, and its detailed description is omitted.

Here, it is desirable that at side edge portions, which face toward the respective adjacent bolt penetration holes 201, of base end portions of the first and second arm portions 11 and 12 of the second yoke 2, tool escape recesses 202 to avoid interference with a bolt tightening tool (e.g. a socket wrench) for tightening the bolts (not shown) at the bolt penetration holes 201 be cut and formed along extending directions of the first and second arm portions 11 and 12.

That is, the bolt penetration holes 201 can be arranged further inward at the flange portion 20 by a distance equivalent to (corresponding to) the avoidance of interference between the bolt tightening tool (not shown) and the first and second arm portions 11 and 12, thereby contributing to size reduction of the second universal joint J2. It is noted that although the tool escape recess 202 is not formed at the second yoke 2 of the first universal joint J1 depicted in FIG. 2, needless to say, formation of the tool escape recess 202 is also effective for the first universal joint J1.

(Configuration of Yoke)

Figure 4:
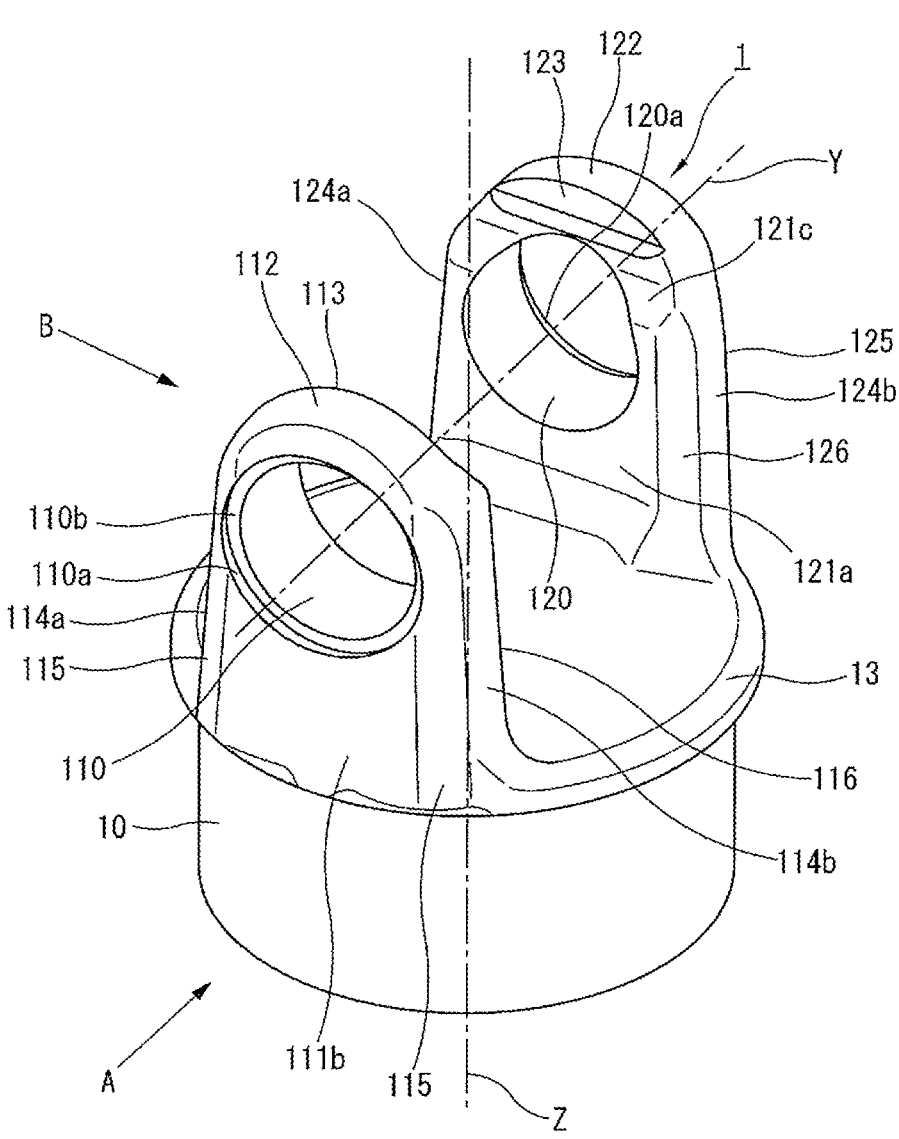
FIG. 4 is a perspective view of a first yoke of the second universal joint shown in FIG. 3, viewed from a second yoke side.
Figure 5:
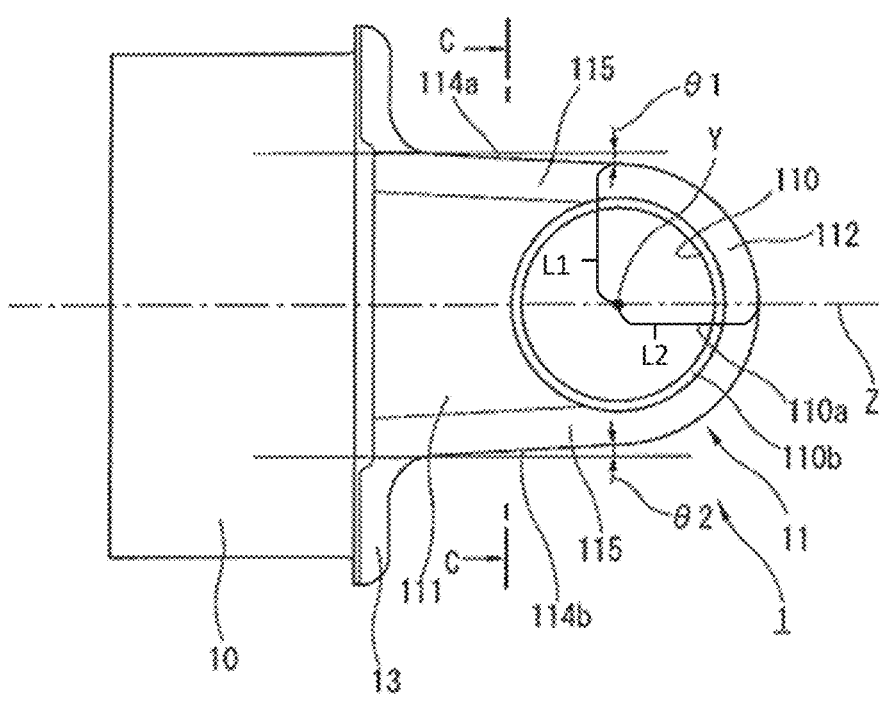
FIG. 5 is a drawing viewed from an A-direction of FIG. 4.
Figure 6:
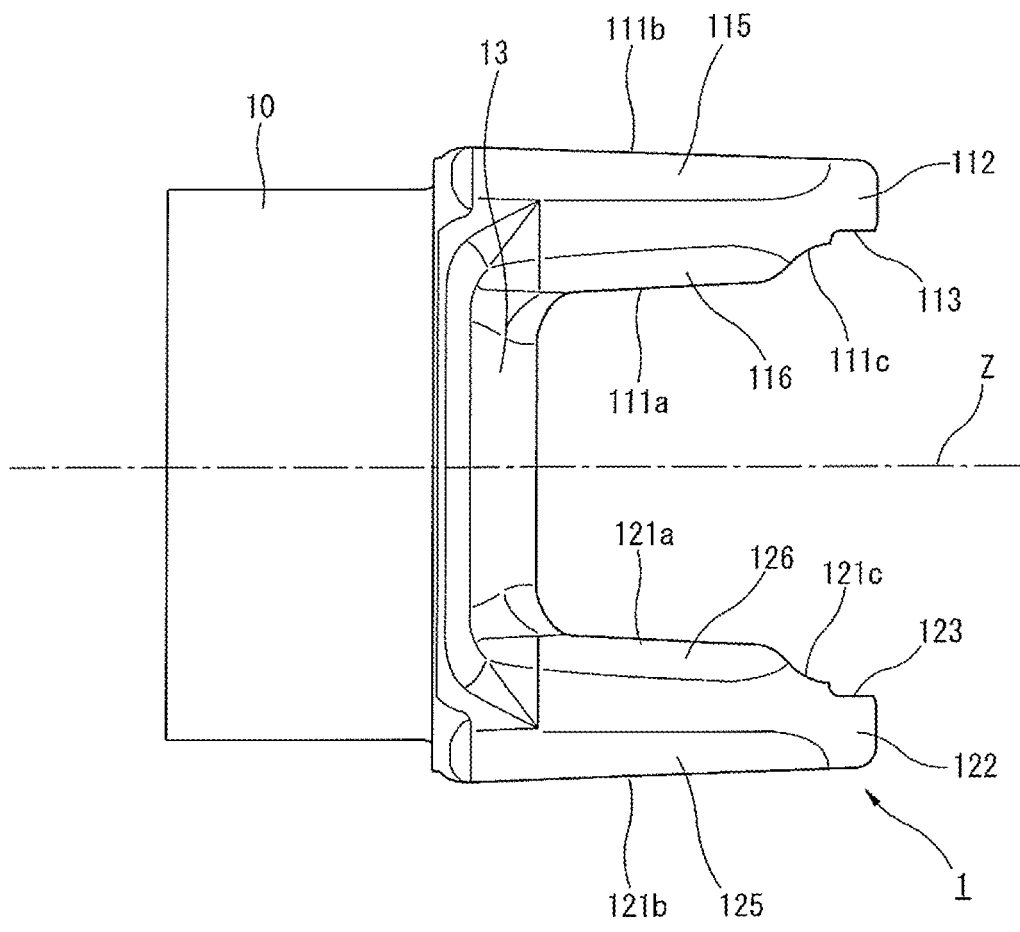
FIG. 6 is a drawing viewed from a B-direction of FIG. 4.
Figure 7:
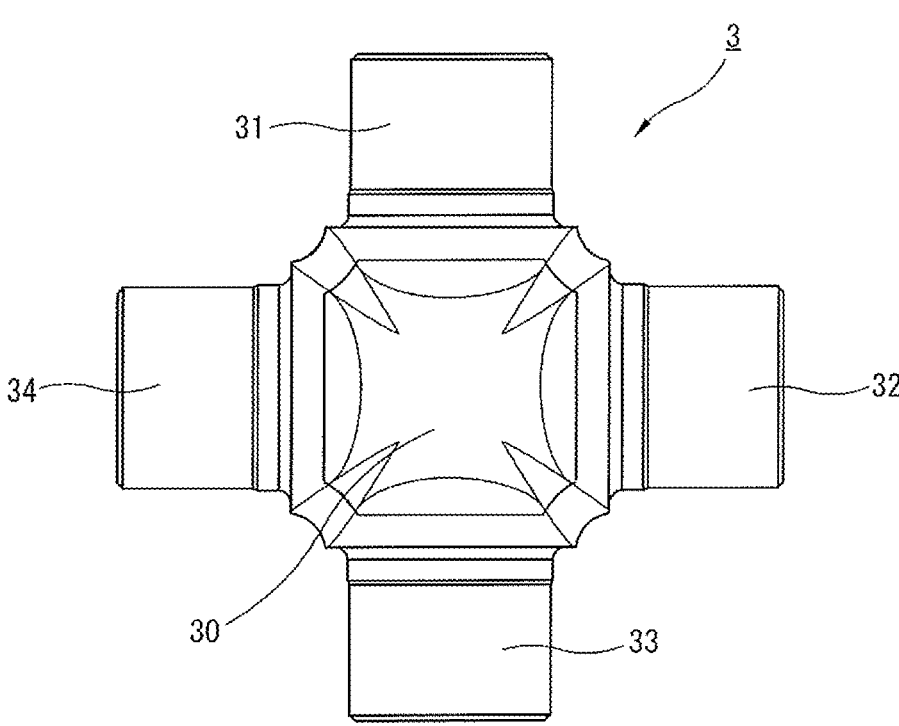
FIG. 7 is a front view of a cruciform shaft shown in FIG. 3.

FIG. 4 is a perspective view of the first yoke of the second universal joint shown in FIG. 3, viewed from the second yoke side. FIG. 5 is a drawing viewed from an A-direction of FIG. 4. FIG. 6 is a drawing viewed from a B-direction of FIG. 4. FIG. 7 is a front view of the cruciform shaft shown in FIG. 3.

As illustrated in FIGS. 4 and 5, the first yoke 1 has the cylindrical-shaped tubular base portion 10 fixed to the second shaft member S2 (see FIG. 1) of the propeller shaft PS by friction welding and the pair of first and second arm portions 11 and 12 extending parallel from a disk-shaped yoke body portion 13 provided at an end portion, facing the second yoke 2, of the tubular base portion 10 toward the second yoke 2 side along the rotation axis Z.

As illustrated in FIGS. 4 to 6, the first and second arm portions 11 and 12 have first and second arm base portions 111 and 121 as general portions connected to the tubular base portion 10 and first and second arm top end portions 112 and 122 protruding to the top end sides of the first and second arm portions 11 and 12 with respect to the first and second arm base portions 111 and 121 and having first and second arm cutting portions 113 and 123 at respective inner side portions in the radial direction of the first and second arm top end portions 112 and 122. These first arm portion 11 and second arm portion 12 have shapes which are symmetric with respect to the rotation axis Z, and arranged parallel along tangent directions with respect to the yoke body portion 13 at an outer peripheral edge of the yoke body portion 13 so as to face each other in the radial direction (the direction of the radial direction line Y) across the rotation axis Z.

Further, as illustrated in FIG. 5, each of these first arm portion 11 and second arm portion 12 is formed into a tapered shape in which a circumferential width (a distance between arm side surfaces 114a and 114b) gradually decreases toward the top end side. That is, the first arm portion 11 is provided so that the pair of arm side surfaces 114a and 114b incline with respect to the rotation axis Z so as to approach the rotation axis Z toward the top end side of the first arm portion 11. Here, it is desirable that angles θ1 and θ2 formed between the pair of arm side surfaces 114a and 114b of the first arm portion 11 and the rotation axis Z be set to 3 degrees or less. The above structure or configuration of the first arm portion 11 is also applied to the second arm portion 12.

As illustrated in FIG. 6, the first and second arm base portions 111 and 121 stand substantially vertically from the outer peripheral edge of the yoke body portion 13, and are formed relatively thick with substantially constant thickness. Further, as illustrated in FIG. 5, at top end sides of the first and second arm base portions 111 and 121, the first and second arm penetration holes 110 and 120 which are circular in plan view are formed so as to penetrate the top end sides of the first and second arm base portions 111 and 121 along the radial direction line Y.

The first and second arm penetration holes 110 and 120 have a substantially constant inside diameter, and internally support the both shaft portions 31 and 33 of the cruciform shaft 3 via the needle bearings 4 (see FIG. 3). As illustrated in FIGS. 4 and 5, at the outer end portions of the first and second arm penetration holes 110 and 120, the first and second countersunk portions 110a and 120a for caulking and fixing the needle bearings 4 are formed so that diameters of the first and second countersunk portions 110a and 120a widen in a stepped manner with respect to inner circumferential surfaces of the first and second arm penetration holes 110 and 120.

As particularly depicted in FIG. 5, the first and second countersunk portions 110a and 120a are formed so that both end portions, in the circumferential direction, of the respective first and second countersunk portions 110a and 120a overlap first and second arm outer edge chamfered portions 115 and 125 (after-mentioned first and second arm outer edge 1st R-chamfered portions 115b and 125b) in the axial direction. With regard to these first and second countersunk portions 110a and 120a, by caulking the first and second stepped portions 110b and 120b formed at inner end portions of the first and second countersunk portions 110a and 120a and plastically deforming inner circumferential edge portions of the first and second stepped portions 110b and 120b inward, the needle bearings 4 accommodated in the first and second arm penetration holes 110 and 120 are prevented from coming off (see FIG. 3).

Further, as illustrated in FIG. 6, at insides of top end portions of the first and second arm base portions 111 and 121, first and second arm inside inclined portions 111c and 121c where a distance between arm inner surfaces 111a and 121a of the first and second arm base portions 111 and 121 gradually increases toward the top ends are formed.

As particularly depicted in FIGS. 4 and 5, the first and second top end portions 112 and 122 are provided at outer sides with respect to the first and second arm penetration holes 110 and 120 in the axial direction, and formed into a substantially arc shape along outer peripheral edges of the first and second arm penetration holes 110 and 120. As shown in FIG. 5, each of these first and second top end portions 112 and 122 has a substantially elliptical shape, and a radial direction length L1 is set to be smaller than an axial direction length L2.

As shown in FIG. 6, the first and second arm cutting portions 113 and 123 are formed by recessing the first and second arm inner surfaces 111a and 121a of the first and second arm portions 11 and 12 in a stepped manner outward in the radial direction (the direction of the radial direction line Y). These first and second arm cutting portions 113 and 123 are provided so as to face toward the outer peripheral edges of the first and second arm penetration holes 110 and 120. The both shaft portions 31 and 33 of the cruciform shaft 3 can be inserted into the first and second arm penetration holes 110 and 120 from the top end sides of the first and second arm portions 11 and 12 through the first and second arm cutting portions 113 and 123.

Further, as illustrated in FIG. 5, at both side edge portions in the circumferential direction on outer sides of the first and second arm base portions 111 and 121, the first and second arm outer edge chamfered portions 115 and 125 extending along the both side edge portions are provided. The first and second arm outer edge chamfered portions 115 and 125 are mainly formed by C-chamfering having a plane cutting surface. These first and second arm outer edge chamfered portions 115 and 125 are formed so as to have a substantially constant circumferential direction width in the axial direction.

As illustrated in FIG. 6, at both side edge portions in the circumferential direction on inner sides of the first and second arm base portions 111 and 121, first and second arm inner edge chamfered portions 116 and 126 extending along the both side edge portions are formed. The first and second arm inner edge chamfered portions 116 and 126 are mainly formed by C-chamfering having a plane cutting surface.

Figure 8:
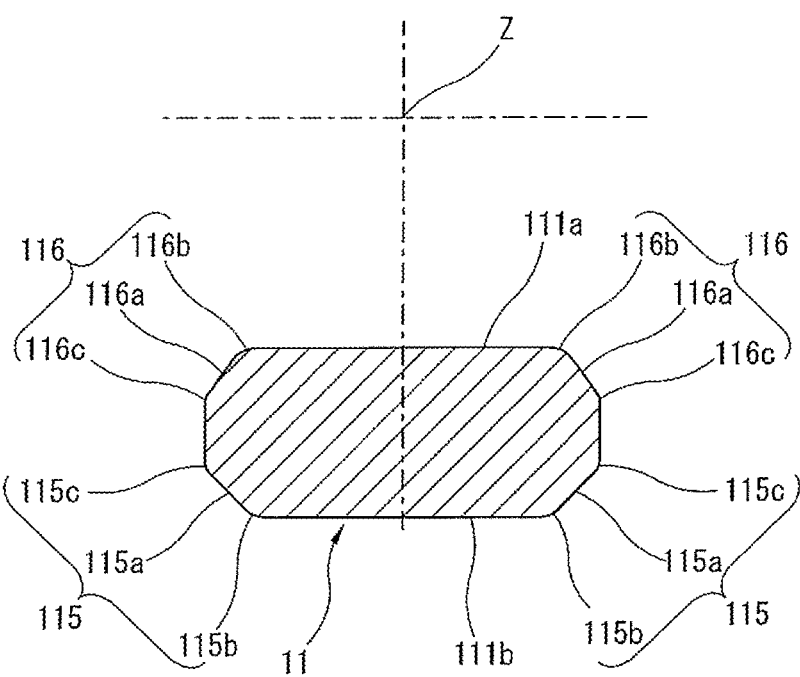
FIG. 8 is a sectional view taken along a C-C line of FIG. 5.

FIG. 8 shows a cross section of the first arm portion 11, cut along a C-C line of FIG. 5.

As shown in FIG. 8, the first and second arm base portions 111 and 121 are formed so that their cross sections, whose arm inner surfaces 111*a* and 121*a* and arm outer surfaces 111*b* and 121*b* are parallel to each other and which have a substantially constant thickness in the axial direction (the extending directions of the first and second arm portions 11 and 12), are a substantially rectangular shape.

At the both side edge portions on the outer sides of the first and second arm base portions 111 and 121, the first and second arm outer edge chamfered portions 115 and 125 extending along the both side edge portions are formed by being cut. That is, since the first and second arm outer edge chamfered portions 115 and 125 are formed, the circumferential direction both side edges of the first and second arm base portions 111 and 121 are recessed radially inward with respect to the first and second arm top end portions 112 and 122. Similar to the first and second arm outer edge chamfered portions 115 and 125, at the both side edge portions on the inner sides of the first and second arm base portions 111 and 121, the first and second arm inner edge chamfered portions 116 and 126 extending along the both side edge portions are formed by being cut.

The first and second arm outer edge chamfered portions 115 and 125 have first and second arm outer edge C-chamfered portions 115*a* and 125*a* having C-chamfering whose cutting surface is a plane surface, the first and second arm outer edge 1st R-chamfered portions 115*b* and 125*b* having R-chamfering smoothly connecting the first and second arm outer edge C-chamfered portions 115*a* and 125*a* and the arm side surfaces 114*a* and 124*a* respectively, and first and second arm outer edge 2nd R-chamfered portions 115*c* and 125*c* having R-chamfering smoothly connecting the first and second arm outer edge C-chamfered portions 115*a* and 125*a* and the arm side surfaces 114*b* and 124*b* respectively. Here, it is desirable that the first and second arm outer edge 1st R-chamfered portions 115*b* and 125*b* and the first and second arm outer edge 2nd R-chamfered portions 115*c* and 125*c* be each set to R-chamfering (R3) having a radius of 3 mm.

Likewise, the first and second arm inner edge chamfered portions 116 and 126 have first and second arm inner edge C-chamfered portions 116*a* and 126*a* having C-chamfering whose cutting surface is a plane surface, first and second arm inner edge 1st R-chamfered portions 116*b* and 126*b* having R-chamfering smoothly connecting the first and second arm inner edge C-chamfered portions 116*a* and 126*a* and the arm side surfaces 114*a* and 124*a* respectively, and first and second arm inner edge 2nd R-chamfered portions 116*c* and 126*c* having R-chamfering smoothly connecting the first and second arm inner edge C-chamfered portions 116*a* and 126*a* and the arm side surfaces 114*b* and 124*b* respectively. Here, it is desirable that the first and second arm inner edge 1st R-chamfered portions 116*b* and 126*b* and the first and second arm inner edge 2nd R-chamfered portions 116*c* and 126*c* be each set to R-chamfering (R3) having a radius of 3 mm.

It is noted that the first and second arm outer edge C-chamfered portions 115*a* and 125*a* are formed to be greater than the first and second arm inner edge C-chamfered portions 116*a* and 126*a*. More specifically, circumferential direction widths W1 of the first and second arm outer edge C-chamfered portions 115*a* and 125*a* are set to be greater than circumferential direction widths W3 of the first and second arm inner edge C-chamfered portions 116*a* and 126*a*. Further, radial direction widths W2 of the first and second arm outer edge C-chamfered portions 115*a* and 125*a* and radial direction widths W4 of the first and second arm inner edge C-chamfered portions 116*a* and 126*a* are set to be the same.

(Working and Effect of the Present Embodiment)

Figure 10:
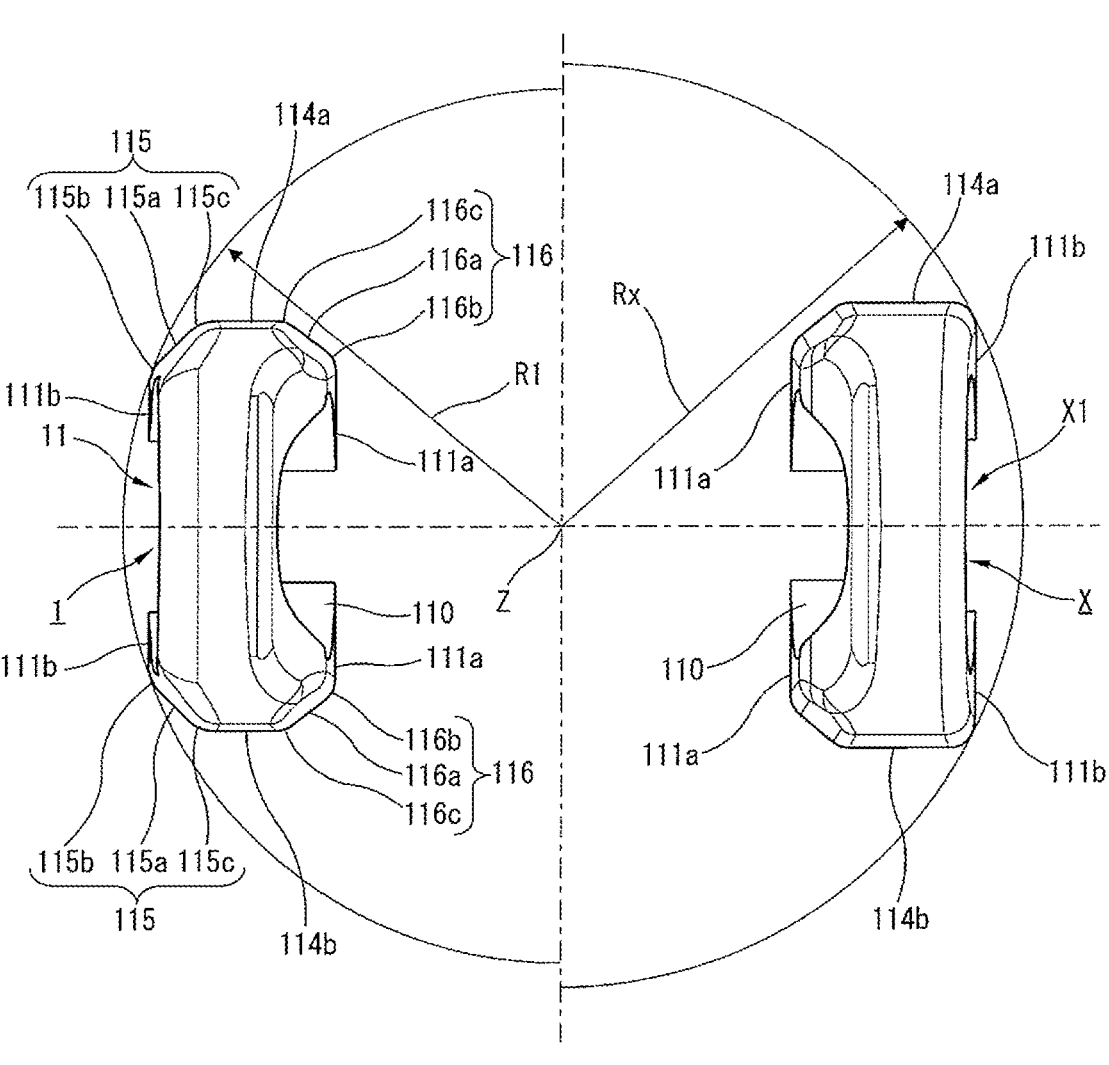
FIG. 10 is a plan view of a first arm portion of the yoke of the present invention and a first arm portion of a conventional yoke, illustrating a comparison between a radius of rotation of the yoke of the present invention and a radius of rotation of the conventional yoke.

FIG. 10 is a plan view of the first yoke 1 according to the present and a conventional yoke X, illustrating a comparison between a radius R1 of rotation of the first yoke 1 and a radius Rx of rotation of the conventional yoke X. In the following description of the first yoke 1 and the conventional yoke X, for the sake of convenience, the first arm portions 11 and X1 are exemplified. However, the description of the first arm portions 11 and X1 is also applied to the second arm portions 12 and X2.

In the case of the conventional yoke X, both side edge portions, in a rotation direction, at the outer side of the first arm portion X1 are each formed by a corner portion (or an angle portion). That is, the first arm portion X1 of the conventional yoke X has a structure in which the arm outer surface 111*b* and the arm side surfaces 114*a* and 114*b* are connected at a substantially right angle. Because of this, the radius Rx of rotation of the yoke X becomes large, and consequently, there is a risk that the yoke X will interfere with other vehicle-mounted components.

Here, as a means of reducing the radius of rotation of the yoke X, it is conceivable that a distance between the arm outer surface 111*b* of one arm portion (the first arm portion X1) and the arm outer surface of the other arm portion (the second arm portion (not shown)) could be shortened. However, in order to reduce a size of the yoke X in this manner, a die for forging the yoke X must be newly designed, and this makes it difficult to contribute to reduction in a manufacturing cost of the yoke X and the propeller shaft PS.

In contrast to this, according to the first yoke 1 of the present embodiment, the following effects can be brought about, then the above technical problem of the conventional yoke X can be solved.

More specifically, a yoke (first and second yokes 1, 2) of a propeller shaft (PS) according to the present invention comprises: a fixing portion (a tubular base portion 10) fixed to a rotation shaft (first and second shaft members S1, S2); a first arm portion (11) and a second arm portion (12) which are a pair of arm portions extending from the fixing portion (the tubular base portion 10) along an axial direction that is a direction of a rotation axis (Z) of the rotation shaft (S1, S2) and facing each other in a radial direction that is orthogonal to the axial direction across the rotation axis (Z); a cruciform shaft (3) supporting the first arm portion (11) and the second arm portion (12); an arm base portion (first and second arm base portions 111, 121) provided at a base end side of each of the first arm portion (11) and the second arm portion (12); an arm top end portion (first and second arm top end portions 112, 122) provided at a top end side with respect to the arm base portion (the first and second arm base portions 111, 121) of each of the first arm portion (11) and the second arm portion (12), wherein the arm top end portion (the first and second arm top end portions 112, 122) is formed thin relative to the arm base portion (the first and second arm base portions 111, 121) by an inner side portion, in the radial direction, thereof being recessed; and arm outer edge chamfered portions (first and second arm outer edge chamfered portions 115, 125) provided at both side edges, in a circumferential direction of the rotation axis (Z), on an outer side, in the radial direction, of the arm base portion (the first and second arm base portions 111, 121) of each of the first arm portion (11) and the second arm portion (12) so as to extend along the both side edges of the arm base portion (the first and second arm base portions 111, 121) in the axial direction, wherein the arm outer edge chamfered portion (the first and second arm outer edge chamfered portions 115, 125) is recessed from the outer side of the arm base portion (the first and second arm base portions 111, 121) toward the rotation axis (Z).

As described above, in the present embodiment, the first and second arm outer edge chamfered portions 115 and 125 are formed along the both side edge portions on the outer sides of the first and second arm base portions 111 and 121. With this, as depicted in FIG. 10, the radius (radii) R1 of rotation of the first and second arm portions 11 and 12 of the first yoke 1 according to the present embodiment becomes smaller than the radius (radii) Rx of rotation of the first and second arm portions X1 and X2 of the conventional yoke X. Therefore, the radius (radii) R1 of rotation of the first and second arm portions 11 and 12 of the first yoke 1 can be reduced, thereby increasing layout property of the first yoke 1 and the propeller shaft PS using this first yoke 1.

Further, in the present embodiment, the arm outer edge chamfered portion (the first and second arm outer edge chamfered portions 115, 125) has an arm outer edge C-chamfered portion (first and second arm outer edge C-chamfered portions 115a, 125a) having C-chamfering whose cutting surface is a plane surface, an arm outer edge 1st R-chamfered portion (first and second arm outer edge 1st R-chamfered portions 115b, 125b) having R-chamfering smoothly connecting the arm outer edge C-chamfered portion (the first and second arm outer edge C-chamfered portions 115a, 125a) and one side surface (an arm side surface 114a), in the circumferential direction, of the arm base portion (the first and second arm base portions 111, 121) and an arm outer edge 2nd R-chamfered portion (first and second arm outer edge 2nd R-chamfered portions 115c, 125c) having R-chamfering smoothly connecting the arm outer edge C-chamfered portion (the first and second arm outer edge C-chamfered portions 115a, 125a) and the other side surface (an arm side surface 114b), in the circumferential direction, of the arm base portion (the first and second arm base portions 111, 121).

As described above, at the first and second arm outer edge chamfered portions 115 and 125, the first and second arm outer edge C-chamfered portions 115a and 125a are connected to the first and second arm outer edge 1st R-chamfered portions 115b and 125b and the first and second arm outer edge 2nd R-chamfered portions 115c and 125c. Therefore, both side edges, in the circumferential direction, of the first and second arm outer edge C-chamfered portions 115a and 125a are not formed into the corner portion (or the angle portion), then an occurrence of stress concentration due to formation (or shape) of the corner portion can be suppressed.

Further, since the first and second arm outer edge C-chamfered portions 115a and 125a are connected to the first and second arm outer edge 1st R-chamfered portions 115b and 125b and the first and second arm outer edge 2nd R-chamfered portions 115c and 125c, the first yoke 1 can be easily removed from a die when forging the first yoke 1, thereby improving formability of the first yoke 1.

Further, in the present embodiment, the arm outer edge 1st R-chamfered portion (the first and second arm outer edge 1st R-chamfered portions 115b, 125b) and the arm outer edge 2nd R-chamfered portion (the first and second arm outer edge 2nd R-chamfered portions 115c, 125c) are each formed by R-chamfering having a radius of 3 mm.

By setting the R-chamfering of the first and second arm outer edge chamfered portions 115 and 125 to be large, the radius of rotation of the first and second arm portions 11 and 12 can be small. On the other hand, since a sectional area of each of the first and second arm portions 11 and 12 becomes small, there is a risk that strength of the first and second arm portions 11 and 12 will be decreased.

Therefore, in the present embodiment, the first and second arm outer edge 1st R-chamfered portions 115b and 125b and the first and second arm outer edge 2nd R-chamfered portions 115c and 125c are formed by the R-chamfering having a radius of 3 mm. Thus, both of reduction in the radius R1 of rotation of the first and second arm portions 11 and 12 and suppression of the decrease in strength of the first and second arm portions 11 and 12 can be achieved.

Further, in the present embodiment, an angle (θ1, θ2) formed between a side surface (arm side surfaces 114a, 114b), in the circumferential direction, of each of the first arm portion (11) and the second arm portion (12) and the rotation axis (Z) is set to 3 degrees or less.

As described above, by setting the angles θ1 and θ2 formed between the arm side surfaces 114a and 114b of each of the first and second arm portions 11 and 12 and the rotation axis Z, which are so-called draft angles, to 3 degrees or less, a distance between the outer surfaces of the first and second arm portions 11 and 12 (a distance between the outer surface of the first arm base portion 111 and the outer surface of the second arm base portion 121) can be shortened, then the radius R1 of rotation of the first and second arm portions 11 and 12 can be further reduced. In addition, since the distance between the outer surfaces of the first and second arm portions 11 and 12 is shortened, a larger bending angle of the first yoke 1 can be secured, thereby improving workability of assembling the propeller shaft PS to the vehicle.

On the other hand, if the so-called draft angles, which are the angles θ1 and θ2 formed between the arm side surfaces 114a and 114b of each of the first and second arm portions 11 and 12 and the rotation axis Z, are set to be too small, it becomes difficult to remove the first yoke1 from a die when forging the first yoke1. Therefore, by setting the angles θ1 and θ2 formed between the arm side surfaces 114a and 114b of each of the first and second arm portions 11 and 12 and the rotation axis Z to 3 degrees or less, good (easy) removal of the first yoke 1 from the die when forging the first yoke 1 can be ensured.

Furthermore, in the present embodiment, the arm top end portion (the first and second arm top end portions 112, 122) has an elliptical shape in which a radial direction length is shorter than an axial direction length.

As described above, since the first and second top end portions 112 and 122 are formed into the elliptical shape in which the radial direction length L1 is shorter than the axial direction length L2. Therefore, as compared with a case where the first and second top end portions 112 and 122 are formed into a perfect circle, the radius R1 of rotation of the first and second arm portions 11 and 12 can be reduced.

Moreover, in the present embodiment, each of the first arm portion (11) and the second arm portion (12) has a countersunk portion (first and second countersunk portions 110a, 120a) at an outer end portion of an arm penetration hole (first and second arm penetration holes 110, 120) in which the cruciform shaft (3) is inserted, and the countersunk portion (the first and second countersunk portions 110a, 120a)) is provided so that a part of the countersunk portion (110a, 120a) overlaps the arm outer edge chamfered portion (the first and second arm outer edge chamfered portions 115, 125) in the axial direction.

As described above, since the first and second countersunk portions 110a and 120a are formed so that parts of the first and second countersunk portions 110a and 120a overlap the first and second arm outer edge chamfered portions 115 and 125 respectively, by forming the first and second countersunk portions 110a and 120a, end edges of the first and second arm outer edge chamfered portions 115 and 125, which are located on the circumferential edges of the first and second arm penetration holes 110 and 120 on the arm outer surfaces 111b and 121b sides, can be removed. Therefore, the radius R1 of rotation of the first and second arm portions 11 and 12 can be reduced by a distance equivalent to (corresponding to) this removal by the first and second countersunk portions 110a and 120a.

Modified Example

Figure 9:
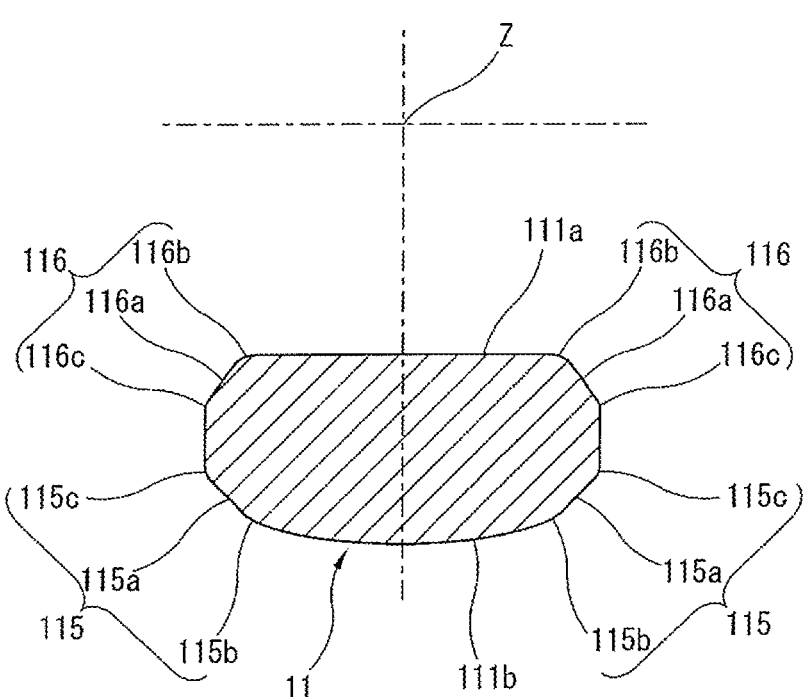
FIG. 9 is a sectional view illustrating other example of the first yoke, which corresponds to the sectional view taken along the C-C line of FIG. 5.

FIG. 9 is a drawing of a modification of the yoke of the propeller shaft PS according to the present invention, showing a sectional view of the first arm portion, which corresponds to the sectional view taken along the C-C line of FIG. 5.

As shown in FIG. 9, with regard to the yoke (the first yoke 1) of the propeller shaft according to the present embodiment, each of the arm outer surfaces 111b and 121b of the first and second arm base portions 111 and 121 is formed by a substantially arc-shaped curved surface that bulges outward (in the radial direction). In other words, in the present embodiment, since the arm outer surfaces 111b and 121b of the first and second arm base portions 111 and 121 are formed so as to bulge outward, the first and second arm base portions 111 and 121 can secure relatively large sectional areas as compared with the first and second arm base portions 111 and 121 according to the first embodiment.

As described above, in the present embodiment, since each of the arm outer surfaces 111b and 121b of the first and second arm base portions 111 and 121 is formed by the arc-shaped curved surface that bulges outward, sectional areas of the first and second arm base portions 111 and 121 are increased, thereby increasing strength (rigidity) of the first and second arm base portions 111 and 121.

The present invention is not limited to the structure or configuration and aspects exemplified in the above embodiments. As long as structure or configuration can obtain working and effect of the present invention described above, the present invention can be freely changed according to specifications of application object, cost, etc.

As the yoke of the propeller shaft based on the embodiments described above, for instance, the following aspects can be raised.

As one aspect of the present invention, a yoke of a propeller shaft comprising: a fixing portion fixed to a rotation shaft; a first arm portion and a second arm portion which are a pair of arm portions extending from the fixing portion along an axial direction that is a direction of a rotation axis of the rotation shaft and facing each other in a radial direction that is orthogonal to the axial direction across the rotation axis; a cruciform shaft supporting the first arm portion and the second arm portion; an arm base portion provided at a base end side of each of the first arm portion and the second arm portion; an arm top end portion provided at a top end side with respect to the arm base portion of each of the first arm portion and the second arm portion, the arm top end portion being formed thin relative to the arm base portion by an inner side portion, in the radial direction, thereof being recessed; and arm outer edge chamfered portions provided at both side edges, in a circumferential direction of the rotation axis, on an outer side, in the radial direction, of the arm base portion of each of the first arm portion and the second arm portion so as to extend along the both side edges of the arm base portion in the axial direction, the arm outer edge chamfered portion being recessed from the outer side of the arm base portion toward the rotation axis.

As a preferable aspect of the present invention, the arm outer edge chamfered portion has an arm outer edge C-chamfered portion having C-chamfering whose cutting surface is a plane surface, an arm outer edge 1st R-chamfered portion having R-chamfering smoothly connecting the arm outer edge C-chamfered portion and one side surface, in the circumferential direction, of the arm base portion and an arm outer edge 2nd R-chamfered portion having R-chamfering smoothly connecting the arm outer edge C-chamfered portion and the other side surface, in the circumferential direction, of the arm base portion.

As another preferable aspect of the present invention, the arm outer edge 1st R-chamfered portion and the arm outer edge 2nd R-chamfered portion are each formed by R-chamfering having a radius of 3 mm.

As a far preferable aspect of the present invention, an angle formed between a side surface, in the circumferential direction, of each of the first arm portion and the second arm portion and the rotation axis is set to 3 degrees or less.

As another preferable aspect of the present invention, the arm top end portion has an elliptical shape in which a radial direction length is shorter than an axial direction length.

As another preferable aspect of the present invention, an outer surface of the arm base portion is formed by an arc-shaped curved surface that bulges outward.

As another preferable aspect of the present invention, each of the first arm portion and the second arm portion has a countersunk portion at an outer end portion of an arm penetration hole in which the cruciform shaft is inserted, and the countersunk portion is provided so that a part of the countersunk portion overlaps the arm outer edge chamfered portion in the axial direction.

Further, as the propeller shaft based on the embodiments described above, for instance, the following aspects can be raised.

As one aspect of the present invention, a propeller shaft comprising: a shaft portion; and a yoke, wherein the yoke has a fixing portion fixed to a rotation shaft; a first arm portion and a second arm portion which are a pair of arm portions extending from the fixing portion along an axial direction that is a direction of a rotation axis of the rotation shaft and facing each other in a radial direction that is orthogonal to the axial direction across the rotation axis; a cruciform shaft supporting the first arm portion and the second arm portion; an arm base portion provided at a base end side of each of the first arm portion and the second arm portion; an arm top end portion provided at a top end side with respect to the arm base portion of each of the first arm portion and the second arm portion, the arm top end portion being formed thin relative to the arm base portion by an inner side portion, in the radial direction, thereof being recessed; and arm outer edge chamfered portions provided at both side edges, in a circumferential direction of the rotation axis, on an outer side, in the radial direction, of the arm base portion of each of the first arm portion and the second arm portion so as to extend along the both side edges of the arm base portion in the axial direction, the arm outer edge chamfered portion being recessed from the outer side of the arm base portion toward the rotation axis.

The invention claimed is:

1. A yoke of a propeller shaft comprising:
a fixing portion fixed to a rotation shaft;
a first arm portion and a second arm portion which are a pair of arm portions extending from the fixing portion along an axial direction that is a direction of a rotation axis of the rotation shaft and facing each other in a radial direction that is orthogonal to the axial direction across the rotation axis;
a cruciform shaft supporting the first arm portion and the second arm portion;
an arm base portion provided at a base end side of each of the first arm portion and the second arm portion;
an arm top end portion provided at a top end side with respect to the arm base portion of each of the first arm portion and the second arm portion, the arm top end portion being formed thin relative to the arm base portion by an inner side portion, in the radial direction, thereof being recessed; and
arm outer edge chamfered portions provided at both side edges, in a circumferential direction of the rotation axis, on an outer side, in the radial direction, of the arm base portion of each of the first arm portion and the second arm portion so as to extend along the both side edges of the arm base portion in the axial direction, the arm outer edge chamfered portion being chamfered from the outer side of the arm base portion toward the rotation axis,
wherein the arm outer edge chamfered portion has an arm outer edge C-chamfered portion having C-chamfering whose cutting surface is a plane surface, an arm outer edge first R-chamfered portion having R-chamfering smoothly connecting the arm outer edge C-chamfered portion and one side surface, in the circumferential direction, of the arm base portion and an arm outer edge second R-chamfered portion having R-chamfering smoothly connecting the arm outer edge C-chamfered portion and the other side surface, in the circumferential direction, of the arm base portion.

2. The yoke of the propeller shaft as claimed in claim 1, wherein
the arm outer edge 1st R-chamfered portion and the arm outer edge 2nd R-chamfered portion are each formed by R-chamfering having a radius of 3 mm.

3. The yoke of the propeller shaft as claimed in claim 1, wherein
an angle formed between a side surface, in the circumferential direction, of each of the first arm portion and the second arm portion and the rotation axis is set to 3 degrees or less.

4. The yoke of the propeller shaft as claimed in claim 1, wherein
an outer surface of the arm base portion is formed by an arc-shaped curved surface that bulges outward.

5. A yoke of the propeller shaft comprising:
a fixing portion fixed to a rotation shaft;

a first arm portion and a second arm portion which are a pair of arm portions extending from the fixing portion along an axial direction that is a direction of a rotation axis of the rotation shaft and facing each other in a radial direction that is orthogonal to the axial direction across the rotation axis;
a cruciform shaft supporting the first arm portion and the second arm portion;
an arm base portion provided at a base end side of each of the first arm portion and the second arm portion;
an arm top end portion provided at a top end side with respect to the arm base portion of each of the first arm portion and the second arm portion, the arm top end portion being formed thin relative to the arm base portion by an inner side portion, in the radial direction, thereof being recessed; and
arm outer edge chamfered portions provided at both side edges, in a circumferential direction of the rotation axis, on an outer side, in the radial direction, of the arm base portion of each of the first arm portion and the second arm portion so as to extend along the both side edges of the arm base portion in the axial direction, the arm outer edge chamfered portion being chamfered from the outer side of the arm base portion toward the rotation axis,
wherein each of the first arm portion and the second arm portion has a countersunk portion at an outer end portion of an arm penetration hole in which the cruciform shaft is inserted, and
wherein the countersunk portion is provided so that a part of the countersunk portion overlaps the arm outer edge chamfered portion in the axial direction.

6. A propeller shaft comprising:
a shaft portion; and
a yoke,
wherein the yoke has
a fixing portion fixed to a rotation shaft;
a first arm portion and a second arm portion which are a pair of arm portions extending from the fixing portion along an axial direction that is a direction of a rotation axis of the rotation shaft and facing each other in a radial direction that is orthogonal to the axial direction across the rotation axis;
a cruciform shaft supporting the first arm portion and the second arm portion;
an arm base portion provided at a base end side of each of the first arm portion and the second arm portion;
an arm top end portion provided at a top end side with respect to the arm base portion of each of the first arm portion and the second arm portion, the arm top end portion being formed thin relative to the arm base portion by an inner side portion, in the radial direction, thereof being recessed; and
arm outer edge chamfered portions provided at both side edges, in a circumferential direction of the rotation axis, on an outer side, in the radial direction, of the arm base portion of each of the first arm portion and the second arm portion so as to extend along the both side edges of the arm base portion in the axial direction, the arm outer edge chamfered portion being chamfered from the outer side of the arm base portion toward the rotation axis,
wherein the arm outer edge chamfered portion has an arm outer edge C-chamfered portion having C-chamfering whose cutting surface is a plane surface, an arm outer edge first R-chamfered portion having R-chamfering smoothly connecting the arm outer edge C-chamfered portion and one side surface, in the circumferential direction, of 5 the arm base portion and an arm outer edge second R-chamfered portion having R-chamfering smoothly connecting the arm outer edge C-chamfered portion and the other side surface, in the circumferential direction, of the arm base portion. 10

\*  \*  \*  \*  \*